United States Patent [19]

Kuhlenschmidt

[11] Patent Number: 6,000,235
[45] Date of Patent: Dec. 14, 1999

[54] ABSORPTION COOLING AND HEATING REFRIGERATION SYSTEM FLOW VALVE

[75] Inventor: Donald Kuhlenschmidt, Evansville, Ind.

[73] Assignee: Gas Research Institute, Chicago, Ill.

[21] Appl. No.: 08/982,623

[22] Filed: Dec. 2, 1997

[51] Int. Cl.[6] .............................. F25B 13/00; F16K 31/44
[52] U.S. Cl. ...................... 62/324.2; 137/625.5; 251/266
[58] Field of Search ..................... 62/101, 476, 324.6, 62/324.2; 137/625.5, 625.48; 251/266

[56] References Cited

U.S. PATENT DOCUMENTS

| | | | |
|---|---|---|---|
| 2,114,316 | 4/1938 | Randel . | |
| 3,636,981 | 1/1972 | Henry | 137/625.46 |
| 3,993,099 | 11/1976 | Nightingale | 137/625.48 |
| 4,306,422 | 12/1981 | Korycki | 62/324.6 |
| 4,312,377 | 1/1982 | Knecht | 137/625.19 |
| 4,445,540 | 5/1984 | Baron et al. | 137/625.43 |
| 4,543,996 | 10/1985 | Baron | 137/625.43 |
| 4,614,202 | 9/1986 | Halvorsen et al. | 137/118 |
| 4,619,119 | 10/1986 | Dijkstra et al. | 62/324.2 |
| 4,646,541 | 3/1987 | Reid, Jr. et al. | 62/476 |
| 4,719,767 | 1/1988 | Reid, Jr. et al. | 62/476 |
| 5,060,694 | 10/1991 | Florida et al. | 137/625.18 |
| 5,120,020 | 6/1992 | Laue | 251/216 |
| 5,226,451 | 7/1993 | Brumfield | 137/625.11 |
| 5,443,241 | 8/1995 | Odaira et al. | 251/129.07 |
| 5,490,393 | 2/1996 | Fuesting et al. | 62/101 |
| 5,579,652 | 12/1996 | Phillips et al. | 62/476 |

*Primary Examiner*—William Doerrler
*Attorney, Agent, or Firm*—Pauley Peterson Kinne & Fejer

[57] ABSTRACT

A reversible flow valve, a corresponding method of fluid flow control and a Generator-Absorber-Heat Exchanger (GAX) system utilizing such a reversible flow valve and method of fluid flow control are provided. The flow valve includes a shaft rotatable relative to the valve housing to place valve seals mounted onto the shaft in a closing and sealing relationship with selected of the flow ports in the housing.

17 Claims, 3 Drawing Sheets

ABSORPTION COOLING AND HEATING REFRIGERATION SYSTEM FLOW VALVE

BACKGROUND OF THE INVENTION

This invention relates generally to cooling and heating refrigeration systems and, more particularly, to a flow valve such as for use in an absorption cooling and heating refrigeration system to appropriately reverse fluid flow in the system.

Absorption cooling and heating systems are well known. In such a system operated in a cooling mode, a generator heats a refrigerant solution comprising a "strong" or concentrated solution of a more-volatile or refrigerant component in a less-volatile or solvent component. The heat drives the refrigerant from the strong solution to separate a refrigerant vapor, leaving a "weak solution" that is depleted of the refrigerant.

Where the refrigerant solution is a solution of a nonvolatile solute in a volatile solvent, such as lithium bromide in water, the "weak solution" contains a higher concentration of the solute but a lower concentration of the solvent than the corresponding "strong solution." Where the refrigerant solution is a solution of a more volatile solute in a less-volatile solvent, such as ammonia in water, the "weak solution" is depleted of ammonia and is mostly water, while the "strong solution" is a more concentrated ammonia solution.

After being separated in the generator, the refrigerant vapor leaves the generator, flowing to a first phase change heat exchange device operated as a condenser. In the condenser the refrigerant vapor is placed under pressure and heat is removed to an external heat sink. As a result, the vapor condenses to form a refrigerant liquid. After leaving the condenser, the refrigerant liquid flows to a second phase change heat exchange device operated as an evaporator. The evaporator relieves the pressure on the refrigerant liquid and the refrigerant evaporates, again forming a vapor. This evaporation of the refrigerant draws heat from a heat load and creates the cooling effect of a refrigerator or air conditioner.

The refrigerant vapor from the evaporator flows to an absorber. The weak solution formed in the generator also flows to the absorber. In the absorber, the weak solution reabsorbs the refrigerant, reforming the strong solution. The strong solution then flows back to the generator and the cycle repeats.

The same system can be operated in a heating mode by reversing operation of the first and second phase change heat exchange devices such that the first phase change heat exchange device now operates as an evaporator and the second phase change heat exchange device operates as a condenser, with the associated heat inputs and outputs correspondingly also being reversed.

For a heating and cooling system to capably operate efficiently alternatively in both heating and cooling modes will generally require the utilization of flow control means whereby the fluid flow through particular system components can be appropriately reversed with no more than minimal or acceptable fluid leakage. As a result, there is a need and a demand for a flow control valve for use in such systems whereby the fluid flow through particular system components can be efficiently and appropriately reversed while avoiding undesired or excessive fluid leakage.

SUMMARY OF THE INVENTION

A general object of the invention is to provide an improved flow valve.

A more specific objective of the invention is to overcome one or more of the problems described above.

The general object of the invention can be attained, at least in part, through a specifically constructed flow valve. The flow valve includes a tubular housing having pairs of flow ports on opposing surfaces and a rotatable shaft axially extending and aligned within the housing. The flow valve includes valve seals mounted on the shaft for selectively closing and sealing at least a first pair of the flow ports. The flow valve further includes an operating member connected to rotate the shaft relative to the housing and to place the valve seals in sealing relationship with the first pair of the flow ports.

The prior art fails to provide a valve construction and design for use in cooling and heating refrigeration systems, more specifically to an absorption cooling and heating refrigeration system, which can effectively reverse the flow through specific system components such as phase change heat exchange devices such as condensers and evaporators, for example, with minimal leakage thereby improving the performance of the system.

The invention further comprehends a GAX system which includes a first refrigerant circuit including a generator, a condenser, an evaporator, an absorber and a GAX device that simultaneously operates as a generator, an absorber and a heat exchanger wherein a refrigerant is circulated. The system also includes at least a first reversing valve whereby the flow of the refrigerant through at least one of the condenser and the evaporator is reversed.

The invention still further comprehends a method of fluid flow control. Such method involves passing a fluid to a 4-way reversing valve which includes: a tubular housing having four pairs of oppositely disposed flow ports; a rotatable shaft axially extending and aligned within the housing; three axially spaced-apart valve seal rings mounted on the shaft whereby a first two pairs of the flow ports are closed and sealed while the remaining two pairs of the flow ports are open to permit flow passage therethrough; and an operating member connected to rotate the shaft relative to the housing, to place two of the valve seal rings in sealing relationship with the first two pairs of the flow ports and to permit fluid flow through the remaining two pairs of the flow ports.

Other objects and advantages will be apparent to those skilled in the art from the following detailed description taken in conjunction with the appended claims and drawings.

DETAILED DESCRIPTION OF THE INVENTION

Figure 1:
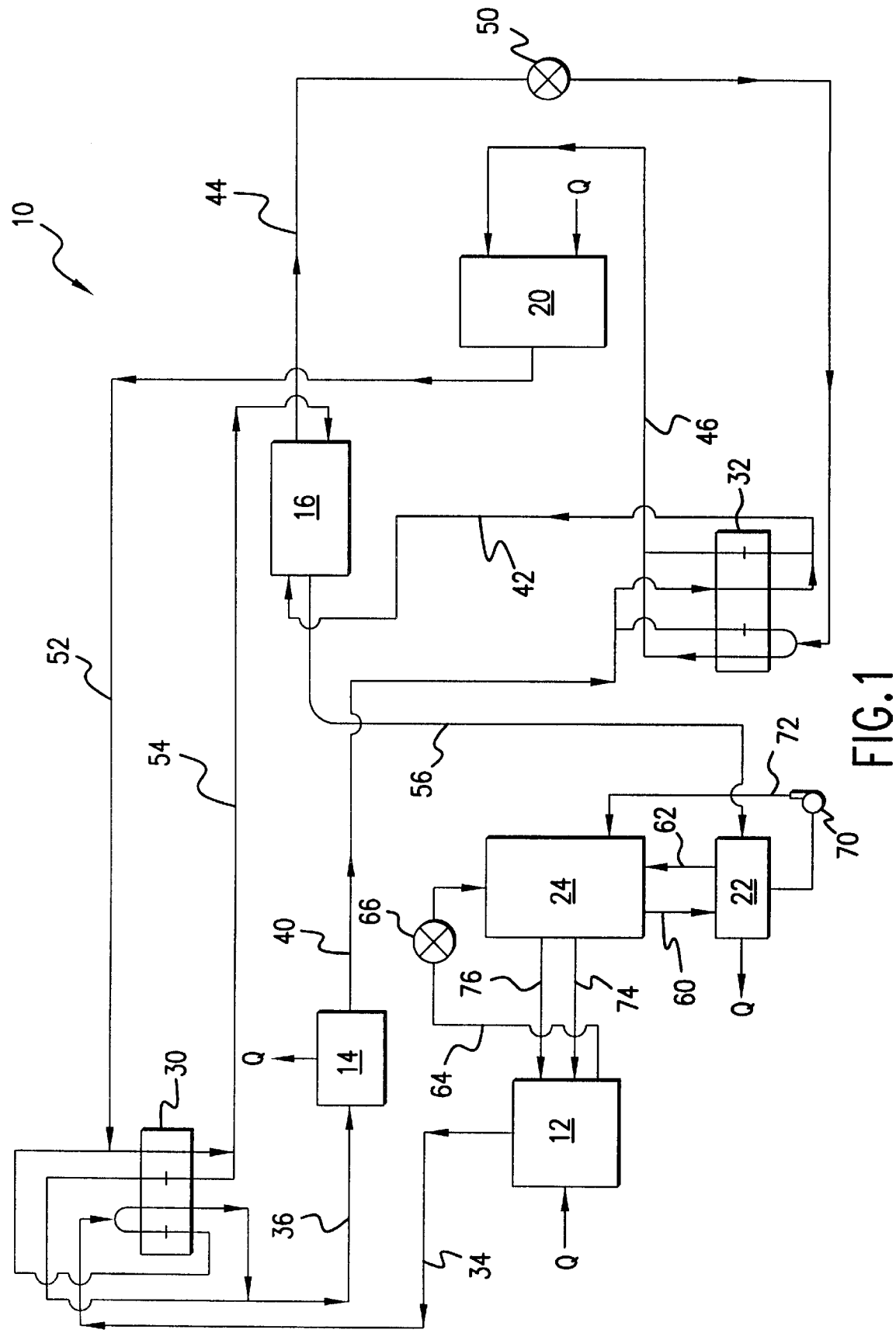
FIG. 1 is a schematic flow diagram of a Generator-Absorber-Heat Exchanger (GAX) system in a cooling mode and utilizing a flow valve in accordance with the one embodiment of the invention.

As shown in FIG. 1, one embodiment of the invention operates in a Generator-Absorber-Heat Exchanger (GAX) system, generally designated by the reference numeral 10. The GAX system 10 is shown in a cooling mode and includes a generator 12, a first phase change heat exchange device 14, a heat exchanger 16, a second phase change heat exchange device 20, an absorber 22, and a GAX device 24 that simultaneously operates as a generator, an absorber and a heat exchanger in addition to first and second flow valves 30 and 32, respectively, in accordance with one embodiment of the invention, shown and described in greater detail below with reference to FIG. 3.

When it enters the generator 12, the strong refrigerant solution generally has its maximum concentration of dissolved refrigerant vapor. The refrigerant solution is heated in the generator 12, as represented by the letter Q and the arrow indicating the direction of heat transfer. The heat distills the refrigerant from the solution to form a free refrigerant vapor and deplete the remaining liquid of refrigerant. The remaining liquid is now a "weak solution". The refrigerant vapor leaves the generator 12 via the conduit 34 and flows via the flow valve 30 and then via the conduit 36 to the first phase change heat exchange device 14, which operates as a condenser.

In the device 14, the refrigerant vapor is maintained under pressure and allowed to cool. As a result, the refrigerant vapor condenses to become a liquid. The heat of condensation Q is removed to a heat sink, which can be anything capable of absorbing heat.

The relatively hot liquid refrigerant under pressure then flows via the conduit 40 from the condenser 14 to the flow valve 32 and then via the conduit 42 to the refrigerant heat exchanger 16 and passed in heat exchange relation with refrigerant vapor from the second phase change heat exchange device 20, thus cooling the liquid refrigerant and heating the refrigerant vapor.

The liquid refrigerant then flows via the conduit 44 to the flow valve 32 and via the conduit 46 to the second phase change heat exchange device 20. As the liquid refrigerant flows to the device 20, a first expansion valve 50 relieves the pressure on the refrigerant. The refrigerant evaporates in the device 20, which operates as an evaporator, absorbing heat Q into the system from a heat load to produce the cooling effect of the cooling mode operation of the present system.

Refrigerant vapor flows from the device 20 via the conduit 52 to the first flow valve 30 and then via the conduit 54 to the refrigerant heat exchanger 16. As described above, in the heat exchanger 16, the hot liquid refrigerant from the first phase change heat exchange device 14 (operating as a condenser) transfers heat to the refrigerant vapor from the second phase change heat exchange device 20 (operating as an evaporator).

The absorber 22 receives vapor from the heat exchanger 16 via the conduit 56 and solution via a first passage 60. The absorber 22 circulates the solution and vapor, such as in a known manner, to at least partially absorb the vapor in the solution. Also, the absorber 22 circulates a coolant in heat exchange relationship with the solution and the vapor (removing heat Q from the absorber) to facilitate absorption of the vapor into the solution. The absorber 22 releases excess vapor to the GAX device 24 via a second passage 62. Alternatively, the first passage 60 and the second passage 62 may be the same passage.

After the generator 12 drives the refrigerant from the strong solution, the remaining solution is a weak solution. The weak solution is hot, having been heated to evaporate and separate the refrigerant vapor. The hot, weak solution flows from the generator 12 via the conduit 64 through a second expansion valve 66 to the GAX device 24.

The GAX device 24 operates as a second absorber such as by circulating the hot, weak solution downward and the vapor received from the absorber 22 upward to absorb the vapor in the solution.

The GAX device 24 also operates as a heat exchanger. The strong solution from the absorber 22 is pumped by the strong solution pump 70 via the conduit 72 to the GAX device 24. The GAX device 24 circulates the cooler, strong solution in heat exchange relationship with the hotter, weak solution from the generator 12. The weak solution transfers heat to the strong solution to preheat the strong solution before it reaches the generator 12. Moreover, by the strong solution absorbing the heat of absorption in the GAX device 24, absorption of vapor into the weak solution is facilitated. Some of the strong solution then flows to the generator 12 via the first generator conduit 74.

Finally, the GAX device 24 also operates as a generator. The strong solution remaining in GAX device 24 continues to circulate in heat exchange relationship with the hot, weak solution, causing the strong solution to become superheated. As it becomes superheated, the strong solution releases at least some vapor. The strong solution and vapor mixture then flows to the generator 12 via the second generator conduit 76. Because the strong solution has already been superheated to release at least some vapor, the load on the generator 12 is lightened and the temperature differential between the weak and strong solution may be utilized.

Figure 2:
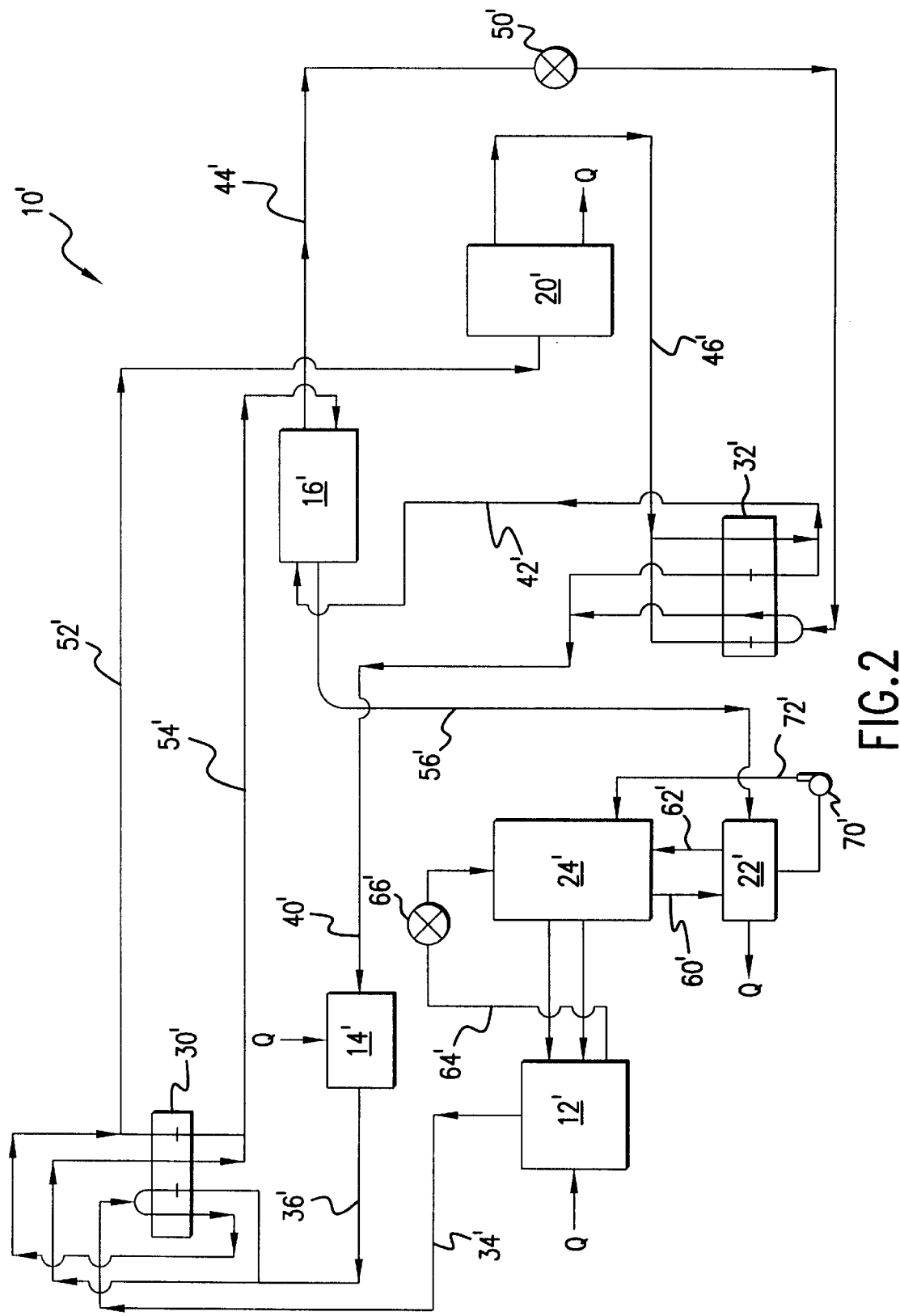
FIG. 2 is a schematic flow diagram of the GAX system of FIG. 1 but now in a heating mode of operation.

FIG. 2 illustrates the GAX system of FIG. 1, now in a heating mode and designated 10'. The system components of the GAX system illustrated in FIG. 2, similar to those identified and discussed above relative to FIG. 1, are identified using the same reference numerals as used relative to FIG. 1 but with the addition of a prime, i.e., "'".

For the purpose of describing the operation of the heating mode GAX system 10', the generator 12', the absorber 22' and the GAX device 24' operate in a manner similar to that described above relative to the cooling mode GAX system 10. For example, hot, weak solution flows from the generator 12' via a conduit 64' through an expansion valve 66' to the GAX device 24'; the absorber 22' receives vapor from the heat exchanger 16' via a conduit 56' and solution via a first passage 60'; the absorber 22' releases excess vapor to the GAX device 24' via a second passage 62'; and the strong solution from the absorber 22' is pumped by a strong solution pump 70' via a conduit 72' to the GAX device 24'.

In the heating mode GAX system 10', however, the first and second flow valves 30' and 32' are utilized to reverse the flow of the refrigerant through each of the first and second phase change heat exchange devices 14' and 20', respectively. As described in greater detail below, such flow reversal results in the first phase change heat exchange device 14' serving as an evaporator and the second phase change heat exchange device 20' serving as a condenser.

In the heating mode GAX system 10', the refrigerant vapor leaves the generator 12' via the conduit 34', flowing to the first flow valve 30' and then, via the conduit 52' to the second phase change heat exchange device 20' which, as identified above, now serves as a condenser with the refrigerant vapor condensing to become a liquid and the heat of condensation Q being appropriately utilized to produce the heating effect of the heating mode of operation of the present system.

The relatively hot liquid refrigerant under pressure then flows via the conduit 46' to the second flow valve 32' and via the conduit 42' to the refrigerant heat exchanger 16' and passed in heat exchange relation with refrigerant vapor from the first phase change heat exchange device 14' (now operating as an evaporator), thus cooling the liquid refrigerant and heating the refrigerant vapor.

The liquid refrigerant then flows via the conduit 44' through an expansion valve 50' to the second flow valve 32' and then via the conduit 40' to the first phase change heat exchange device 14'. The refrigerant evaporates in the device 14', absorbing heat Q into the system from a heat load.

Refrigerant vapor flows from the phase change heat exchange device 14' to the flow valve 30' via the conduit 36' and then from the flow valve 30' to the refrigerant heat exchanger 16' via the conduit 54'. As described above, in the heat exchanger 16', the hot liquid refrigerant from the phase change heat exchange device 20' transfers heat to the refrigerant vapor from the phase change heat exchange device 14'.

Figure 3:
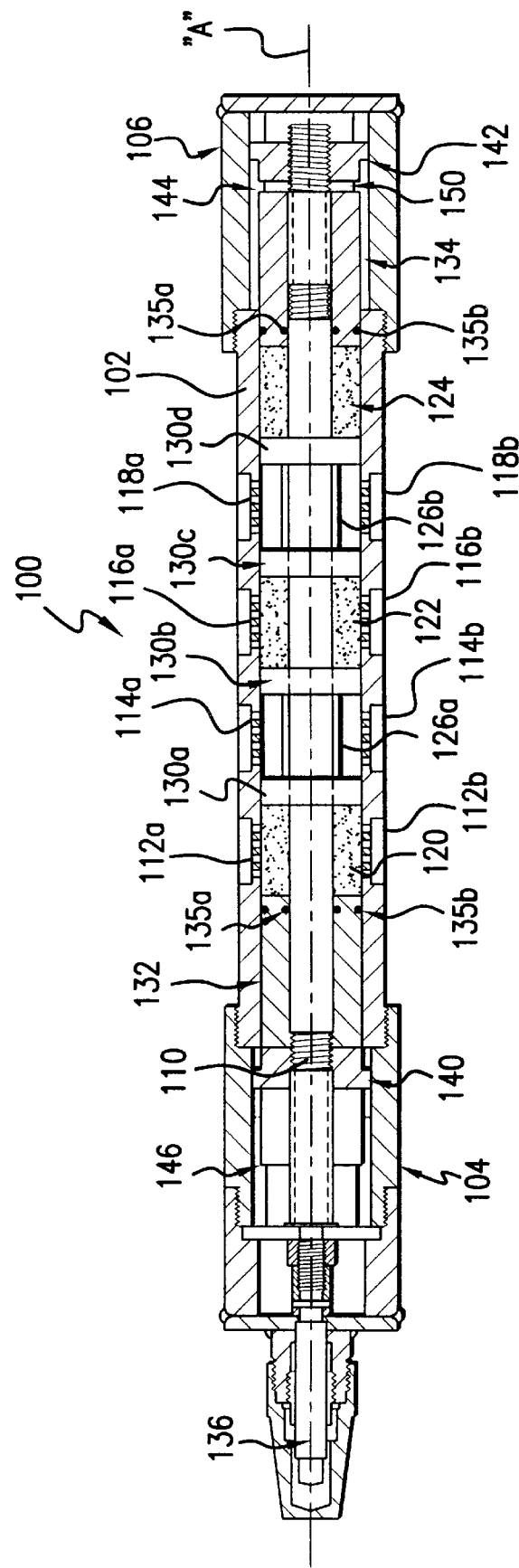
FIG. 3 is a simplified cross sectional view of a flow valve in accordance with one embodiment of the invention utilized in the system illustrated in FIGS. 1 and 2.

Now, turning to FIG. 3, there is shown a simplified cross sectional view of a flow valve, designated by the reference numeral 100, in accordance with one embodiment of the invention and such as utilized in the system illustrated in FIGS. 1 and 2.

The flow valve 100 is formed having an outer tubular housing 102 with opposite end cap assemblies 104 and 106, respectively. The flow valve 100 also includes a threaded rotatable shaft 110 axially extending along the axis "A" and aligned within the housing 102. The housing 102 includes four pairs of axially spaced-apart, oppositely disposed flow ports 112(*a* and *b*), 114(*a* and *b*), 116(*a* and *b*) and 118(*a* and *b*).

Mounted onto the shaft 110, are three axially spaced-apart valve seals each having the form of a ring and individually designated 120, 122 and 124, respectively, such as formed of an elastomeric material effective to prevent leakage through a sealed flow port while being generally resistant to chemicals with which in use the seal may come into contact. Various elastomeric materials may be suitable for use in the practice of the invention including, for example, rubber types of material such as ETDM.

The valve seal rings 120, 122 and 124 are spaced apart and further held in place by means of spacer elements 126(*a* and *b*) and pressure pads 130(*a–d*). End spacer elements 132 and 134 assist in maintaining the valve seal rings 120, 122 and 124 properly spaced relative to the end caps 104 and 106, respectively, for proper operation of the flow valve. As shown, each of the end spacer elements may desirably include one or more appropriate O-ring or similar seals 135*a* and 135*b*.

The flow valve 100 includes a rotatable operating member activator 136 connected to the valve shaft 110 whereby the valve shaft 110 can be selectively rotated relative to the housing 102. The flow valve 100 further includes first and second sliding activators 140 and 142, each being internally threaded and threadedly attached to the shaft 110.

In the illustrated embodiment, when the operating member activator 136 is rotated counter clockwise, the sliding activators 140 and 142, being internally threadedly attached to the shaft 110, move in conjunction with all the components arranged on the shaft 110 toward the end cap 106 until the end spacer element 134 has reached a stop 144 located at the end cap 106. At this juncture the valve seal rings 120 and 122 are symmetrically over the first pair of ports 112(*a* and *b*) and the third pair of ports 116(*a* and *b*), respectively. Further counterclockwise rotation of the operating member 136 and, in turn, the shaft 110, results in compression of the valve seal rings 120 and 122 adjacent the first and third pairs of ports, 112(*a* and *b*) and 116(*a* and *b*), respectively, thereby effectively sealing and preventing fluid flow through these ports. The second and fourth pairs of ports, 114(*a* and *b*) and 118(*a* and *b*), respectively, are left open to permit flow therethrough.

When the operating member activator 136 of the valve 100 is subsequently rotated clockwise, the sliding activators, 140 and 142, respectively, and related valve assembly components including, for example, the valve seal rings 120, 122 and 124; the spacer elements 126*a* and 126*b*; the pressure pads 130(*a–d*); and the end spacer elements 132 and 134 are moved in conjunction toward the end cap 104 until the end spacer element 132 reaches the stop 146. A void space 150 between the end spacer element 134 and the sliding activator 142 allows the seal rings 120, 122 and 124 to expand before the end spacer element 134 is contacted by the sliding activator 142 to move the related components until stop 146 is reached. At that juncture, the valve seal rings 122 and 124 are symmetrically over the second pair of ports 114(*a* and *b*) and the fourth pair of ports 118(*a* and *b*), respectively. Further counter clockwise rotation of the operating member 136 and, in turn, the valve shaft 110, results in compression of the valve seal rings 122 and 124 adjacent the second and fourth pairs of ports, 114(*a* and *b*) and 118(*a* and *b*), respectively, thereby effectively sealing and preventing fluid flow through these ports. The first and third pairs of ports, 112(*a* and *b*) and 116(*a* and *b*), respectively, are left open to permit flow therethrough.

It will be appreciated that the invention can be practiced using an operating member which is manually rotated, such as directly by hand or through the use of a tool such as a hand wrench, or automatically rotated, such as through appropriate attachment to or with a motor.

In FIG. 1 showing the illustrated GAX system in a cooling mode, for the flow valve 30, the second and fourth pairs of ports, 114(*a* and *b*) and 118(*a* and *b*), respectively, are left open to permit flow therethrough, while the first and third pairs of ports 112(*a* and *b*) and 116(*a* and *b*), respectively, are effectively sealed closed (as shown in FIG. 3), while for the flow valve 32, the first and third pairs of ports 112(*a* and *b*) and 116(*a* and *b*), respectively, are left open to permit flow therethrough, while the second and fourth pairs of ports, 114(*a* and *b*) and 118(*a* and *b*), respectively, are effectively sealed closed.

In FIG. 2, showing the illustrated GAX system in a heating mode, the system flow valves have been reversed such that for the flow valve 30', the first and third pairs of ports 112(*a* and *b*) and 116(*a* and *b*), respectively, are left open to permit flow therethrough, while the second and fourth pairs of ports, 114(*a* and *b*) and 118(*a* and *b*), respectively, are effectively sealed closed, while for the flow valve 32', the second and fourth pairs of ports, 114(*a* and *b*) and 118(*a* and *b*), respectively, are left open to permit flow therethrough, while the first and third pairs of ports 112(*a* and *b*) and 116(*a* and *b*), respectively, are effectively sealed closed (as shown in FIG. 3).

Thus, the invention provides a reversing flow valve having a shaft rotatable relative to a corresponding valve housing to place valve seals mounted onto the shaft in a closing and sealing relationship with selected of the flow ports in the housing.

While the invention has been described above relative to flow valves each including 4 pairs of opposed ports, it will be understood that the invention alternatively could be practiced by replacing one or both such 4-way reversing valves with a pair of similarly designed two-way reversing valves.

It is further to be understood that, the two 4-way reversing valves in the above described reversible GAX system can, if desired, be replaced by a similarly designed reversing valve having 8 pairs of opposed ports.

As described herein, such a flow valve is useful in such a system to reverse the flow of the refrigerant through one or more phase change heat exchange devices such as a condenser and an evaporator.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A flow valve comprising:
    a tubular housing having pairs of radially aligned flow ports on opposing surfaces wherein each pair of flow ports includes an inlet port and an outlet port,
    a rotatable shaft axially extending and aligned within said housing,
    valve seals mounted on said shaft for selectively closing and sealing at least a first pair of said flow ports, and
    an operating member connected to rotate said shaft relative to said housing and to place said valve seals in sealing relationship with said first pair of said flow ports.

2. The flow valve of claim 1 wherein at least one of said valve seals comprises an elastomeric material effective to prevent leakage through a sealed flow port.

3. The flow valve of claim 1 wherein at least one of said valve seals has the form of a ring.

4. The flow valve of claim 3 wherein at least one of said valve seals comprises an elastomeric material effective to prevent leakage through a sealed flow port.

5. The flow valve of claim 1 comprising at least four of said pairs of oppositely disposed flow ports.

6. A flow valve comprising:
    a tubular housing having at least four pairs of flow ports on opposing surfaces,
    a rotatable shaft axially extending and aligned within said housing,
    valve seals mounted on said shaft for selectively closing and sealing at least a first pair of said flow ports,
    an operating member connected to rotate said shaft relative to said housing and to place said valve seals in sealing relationship with said first pair of said flow ports, and
    at least three axially spaced-apart valve seals mounted on said shaft whereby two pairs of said flow ports are selectively closed and sealed while the other two pairs of said flow ports are open to permit flow passage therethrough, with said operating member connected to rotate said shaft relative to said housing whereby two of said valve seal rings are placed in sealing relationship with a first and second pair of said flow ports.

7. The flow valve of claim 6 wherein rotation of said shaft relative to said housing alternatively places two of said valve seal rings in sealing relationship with a third and a fourth pair of said flow ports.

8. The flow valve of claim 7 wherein each of said valve seals comprises an elastomeric material effective to prevent leakage through a sealed flow port.

9. The flow valve of claim 1 comprising at least three axially spaced-apart valve seals mounted on said shaft, each of said valve seals in the form of a ring of elastomeric material effective to prevent leakage through a sealed port.

10. A GAX system comprising:
    a first refrigerant circuit including a generator, a condenser, an evaporator, an absorber and a GAX device that simultaneously operates as a generator, an absorber and a heat exchanger wherein a refrigerant is circulated and at least a first reversing valve whereby the flow of the refrigerant through at least one of said condenser and said evaporator is reversed, wherein said first reversing valve includes:
    a tubular housing having four pairs of oppositely disposed flow ports,
    a rotatable shaft axially extending and aligned within said housing,
    three axially spaced-apart valve seal rings mounted on said shaft whereby two pairs of said flow ports are selectively closed and sealed while the other two pairs of said flow ports are open to permit flow passage therethrough, and
    an operating member connected to rotate said shaft relative to said housing and to place two of said valve seal rings in sealing relationship with a first and second pair of said flow ports.

11. The GAX system of claim 10 wherein rotation of said shaft relative to said housing alternatively places two of said valve seal rings in sealing relationship with a third and a fourth pair of said flow ports.

12. The GAX system of claim 10 wherein each of said valve seals comprises an elastomeric material effective to prevent leakage through a sealed flow port.

13. A GAX system comprising:
    a first refrigerant circuit including a generator, a condenser, an evaporator, an absorber and a GAX device that simultaneously operates as a generator, an absorber and a heat exchanger wherein a refrigerant is circulated and at least a first reversing valve whereby the flow of the refrigerant through at least one of said condenser and said evaporator is reversed, wherein said first reversing valve is effective to reverse the flow of the refrigerant through said condenser, said system additionally comprising a second reversing valve whereby the flow of the refrigerant through said evaporator is reversed.

14. A method of fluid flow control comprising:
    passing a fluid to a 4-way reversing valve which includes: a tubular housing having four pairs of oppositely disposed flow ports; a rotatable shaft axially extending and aligned within the housing; three axially spaced-apart valve seal rings mounted on said shaft whereby a first two pairs of the flow ports are closed and sealed while the remaining two pairs of the flow ports are open to permit flow passage therethrough; and an operating member connected to rotate the shaft relative to the housing, to place two of the valve seal rings in sealing relationship with the first two pairs of the flow ports and to permit fluid flow through the remaining two pairs of the flow ports.

15. The method of claim 14 additionally comprising the step of reversing flow through the valve whereby the remaining two pairs of the flow ports are closed and sealed while the first two pairs of the flow ports are open to permit flow passage therethrough.

16. In a GAX system which includes a first refrigerant circuit including a generator, a condenser, an evaporator, an absorber and a GAX device that simultaneously operates as a generator, an absorber and a heat exchanger wherein a first refrigerant is circulated, the method of claim 14 to reverse the flow of the first refrigerant through at least one of the condenser and the evaporator.

17. In a GAX system which includes a first refrigerant circuit including a generator, a condenser, an evaporator, an absorber and a GAX device that simultaneously operates as a generator, an absorber and a heat exchanger wherein a first refrigerant is circulated, the method of claim 14 to reverse the flow of the first refrigerant through each of the condenser and the evaporator.

* * * * *